United States Patent
Albl (10) Patent No.: US 11,370,312 B2
(45) Date of Patent: Jun. 28, 2022

(54) INDUCTIVE CHARGING ARRANGEMENT FOR A VEHICLE BATTERY

(71) Applicant: AUDI AG, Ingolstadt (DE)

(72) Inventor: Sebastian Albl, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 146 days.

(21) Appl. No.: 16/960,154

(22) PCT Filed: Nov. 19, 2018

(86) PCT No.: PCT/EP2018/081777
§ 371 (c)(1),
(2) Date: Jul. 6, 2020

(87) PCT Pub. No.: WO2019/137669
PCT Pub. Date: Jul. 18, 2019

(65) Prior Publication Data
US 2021/0122254 A1 Apr. 29, 2021

(30) Foreign Application Priority Data
Jan. 10, 2018 (DE) ...................... 10 2018 200 252.5

(51) Int. Cl.
*B60L 53/12* (2019.01)
*H02J 50/10* (2016.01)
(Continued)

(52) U.S. Cl.
CPC ............... *B60L 53/12* (2019.02); *B60L 53/38* (2019.02); *H01F 1/44* (2013.01); *H01F 3/10* (2013.01);
(Continued)

(58) Field of Classification Search
CPC ............ B60L 53/12; B60L 53/38; H02J 50/10
(Continued)

(56) References Cited

U.S. PATENT DOCUMENTS

| 2013/0154553 A1* | 6/2013 | Steele | B60M 7/003 320/108 |
| 2014/0340035 A1* | 11/2014 | Maekawa | H01F 27/36 320/108 |

(Continued)

FOREIGN PATENT DOCUMENTS

| DE | 10003818 A1 | 8/2001 |
| DE | 102011108386 A1 | 1/2013 |

(Continued)

OTHER PUBLICATIONS

German Examination Report dated Dec. 18, 2018 in corresponding German Application No. 10 2018 200 252.5; 36 pages; Machine translation attached.

(Continued)

*Primary Examiner* — Suchin Parihar
(74) *Attorney, Agent, or Firm* — Maier & Maier, PLLC (57) ABSTRACT

An inductive charging arrangement for a vehicle battery having a counter coil arrangement which comprises at least one primary coil arrangement located outside the vehicle and at least one secondary coil arrangement located inside the vehicle, wherein primary coil arrangement and secondary coil arrangement each comprise a coil and a magnetic core and, with appropriate positioning of the vehicle and energizing of the primary coil arrangement, electric energy is transmitted by inductive coupling from the primary coil arrangement to the secondary coil arrangement wherein the air gap is part of the transmission region and means are provided to minimize the air gap between the primary coil arrangement and the secondary coil arrangement.

15 Claims, 4 Drawing Sheets

(51) Int. Cl.
  *B60L 53/38* (2019.01)
  *H01F 1/44* (2006.01)
  *H01F 3/10* (2006.01)
  *H02J 7/00* (2006.01)

(52) U.S. Cl.
  CPC ............ *H02J 7/0042* (2013.01); *H02J 50/10* (2016.02); *H01F 2003/106* (2013.01); *H02J 2310/48* (2020.01)

(58) Field of Classification Search
  USPC .......................................................... 320/108
  See application file for complete search history.

(56) References Cited

U.S. PATENT DOCUMENTS

| | | | | |
|---|---|---|---|---|
| 2015/0061593 | A1* | 3/2015 | Wechlin | B60L 53/12 320/109 |
| 2015/0224882 | A1* | 8/2015 | Brill | B60L 53/126 320/108 |
| 2015/0327405 | A1* | 11/2015 | Niizuma | B60L 53/38 307/104 |
| 2016/0013664 | A1 | 1/2016 | Maekawa et al. | |
| 2016/0056664 | A1 | 2/2016 | Partovi | |
| 2017/0080815 | A1 | 3/2017 | Wechsler et al. | |

FOREIGN PATENT DOCUMENTS

| | | |
|---|---|---|
| DE | 102014015192 A1 | 4/2015 |
| DE | 102014218217 A1 | 3/2016 |
| DE | 102015119200 A1 | 5/2016 |
| DE | 102015217274 A1 | 3/2017 |
| DE | 102016203350 A1 | 9/2017 |
| WO | 2009/048339 A1 | 4/2009 |
| WO | 2014/029439 A1 | 2/2014 |

OTHER PUBLICATIONS

International Search Report with English translation and Written Opinion with Machine translation dated Mar. 6, 2019 in corresponding International Application No. PCT/EP2018/081777; 15 pages.
Dr. Armin Nethe, "Kraftverstarkende Wirkung von Ferrofluiden", Jan. 1, 2001, Retrieved from the Internet: http://www.dr-nethe.de/forschung/kraftverstaerkung Machine translation attached.
International Preliminary Report on Patentability dated Jul. 14, 2020, in connection with corresponding International Application No. PCT/EP2018/081777 (6 pp.).

* cited by examiner

INDUCTIVE CHARGING ARRANGEMENT FOR A VEHICLE BATTERY

FIELD

The subject matter of the invention is an inductive charging arrangement for a vehicle battery.

BACKGROUND

In electrically driven vehicles, a battery is typically used, which acquires the electric energy necessary for the drive from outside the vehicle and stores it temporarily. A charging unit is provided on the vehicle for charging the battery, which has to be connected to an external charging station for the energy supply. If the connection from the external charging station to the installed charging unit has heretofore preferably been established by means of cables and plug connections in vehicles, there are more and more proposals in other technical fields for effectuating the energy transport from the charging station to the charging unit in the vehicle by inductive coupling. In principle, such inductive coupling has been known for some time and is already being used in many technical fields, particularly in areas subject to moisture or where establishing an electrical connection is perceived to be annoying.

Inductive charging devices for vehicles comprise, on the one hand, a charging unit, which is introduced into a ground region traversable by the vehicle and represents the charging station, in which a primary coil arrangement is arranged, and a vehicle-side charging unit, which contains a secondary coil arrangement. Primary coil arrangement and secondary coil arrangement each comprise a coil which has a coil core of high magnetic conductivity. With suitable positioning of the secondary coil arrangement above the primary coil arrangement arranged in the ground region, electric energy can be transmitted from the primary coil to the secondary coil. The transmission region extending between primary coil arrangement and secondary coil arrangement here also includes the air gap resulting between primary coil arrangement and secondary coil arrangement, which is to be minimized for better inductive coupling and thus better power transmission. This is because the efficiency of this wireless energy transmission is substantially dependent on how large the air gap is between the primary coil arrangement and the secondary coil arrangement and how exactly the primary coil arrangement is oriented towards the secondary coil arrangement.

A charging unit is known from WO 2014029439 A1, which comprises a primary coil for inductively charging a traction battery of an electrically drivable vehicle, which is movable by means of a pressurized medium in a first direction toward a secondary coil of the vehicle. The primary coil is located on an at least temporarily elastic mounting device here. The device for raising the primary coil can be a folded bellows in this case, which is inflated by means of a compressor.

A similar arrangement is described in US 2017/0080815 A1. However, the folded bellows is intended as a protection for a mechanical lifting mechanism therein.

Furthermore, DE 10 2014 218 217 A1 describes a charging arrangement for motor vehicles which has a dome-shaped cover for removing foreign bodies located on the ground part, which can also be designed so that it may be unfolded if needed to cause foreign bodies to slide off better.

The above-mentioned prior art has the disadvantage that the entire primary coil arrangement has to be displaced in each case in order to minimize the air gap between primary coil arrangement and secondary coil arrangement.

DE 10 2016 203 350 A1 describes different coil arrangements for inductive charging systems for charging electric vehicles. Three types are particularly emphasized. A first variant is a circular coil arrangement. Circular coils have the advantage that they generate a rotationally symmetrical field distribution. The alignment of the motor vehicle in the horizontal direction is therefore less critical if a small distance and a good overlap of the two coil arrangements is ensured. The disadvantage of such coil arrangements is that they have only little field guidance, so that the leakage flux is very large.

A second embodiment is a so-called DD coil arrangement. Such a coil arrangement comprises two ferrite cores arranged adjacent to one another and a coil wire. The coil wire is wound in each case with the same number of turns around the respective ferrite core, wherein the winding direction of the turn around the first ferrite core is opposite to the winding direction of the turn around the other ferrite core. Such DD coil arrangements have good field guidance and thus little scattering loss, but have the disadvantage that the horizontal alignment of the secondary coil must be as precise as possible, which increases the effort involved in aligning the secondary coil in relation to the primary coil.

A third embodiment, which is to be referred to here as a coaxial coil arrangement, combines the advantages of both arrangements and avoids their disadvantages. For this purpose, the first ferrite core is designed as a hollow cylinder and the second ferrite core as a solid cylinder or as a hollow cylinder. The external diameter of the second ferrite core is smaller than the internal diameter of the first ferrite core and the second ferrite core is arranged concentrically inside the first ferrite core. The coil wire is wound in each case with the same number of turns around the respective ferrite core, wherein the winding direction of the turn around the first ferrite core is opposite to the winding direction of the turn around the other ferrite core.

SUMMARY

Proceeding from this prior art, it is the object of the invention to specify an inductive charging arrangement for a vehicle battery, which minimizes the air gap without changing the location of the primary coil or the secondary coil and/or their coil core and which is usable equally for all known coil arrangements. Furthermore, it is part of the object to specify a method for operating the arrangement.

The starting point was an inductive charging arrangement of the type described above. It is proposed according to the invention that at least one reversibly deformable container, filled or fillable with a liquid of high magnetic conductivity, is arranged and formed in the region of the primary coil arrangement and/or in the region of the secondary coil arrangement such that the container deforms in the direction of the respective other coil arrangement of the counter coil arrangement by pressurizing the liquid of high magnetic conductivity. Furthermore, it is proposed that the deformable container and the liquid of high magnetic conductivity located therein are arranged such that the liquid of high magnetic conductivity, at least after the deformation of the reversibly deformable container, minimizing the air gap, is part of the transmission region between primary coil arrangement and secondary coil arrangement.

The reversibly deformable container can be deformed, for example, by constricting force on the container filled with the liquid of high magnetic conductivity perpendicular to its deformation direction or by conveying additional liquid of high magnetic conductivity under pressure into the container.

The proposed design of the charging arrangement advantageously ensures that neither the primary coil and/or its coil core, nor the secondary coil and/or its coil core have to be displaced to minimize the air gap. Rather, only the liquid of high magnetic conductivity in a reversibly deformable container is pressurized such that the reversibly deformable container deforms in the direction toward the respective other coil arrangement and said liquid, minimizing the air gap, is part of the transmission region and thus of the magnetic circuit. By minimizing the air gap, when the primary coil is energized, the magnetic resistance of the magnetic circuit formed by primary coil arrangement and secondary coil arrangement decreases, so that a high magnetic flux is implementable in the magnetic circuit and thus a high electrical power can be transmitted.

A reversibly deformable container filled with liquid of high magnetic conductivity can be arranged both in the region of the primary coil arrangement and also in the region of the secondary coil arrangement or also in each case in the region of both, the arrangement in the region of the secondary coil arrangement has the advantage that the amount of the displacement is adaptable easily to the vehicle type. The arrangement on the primary coil implies additional effort with respect to this aspect, but has the advantage that a corresponding arrangement in the vehicle can be omitted, which provides cost advantages.

In one design of the invention, it is advantageous to select a ferrofluid for the liquid of high magnetic conductivity. Ferrofluids have the property of reacting to magnetic fields to conduct the magnetic flux without solidifying.

Furthermore, in one design of the invention it is advantageous to apply spring force to deformable containers against their deformation direction. This ensures that the reversibly deformable container returns back into its starting position as soon the pressurization of the liquid of high magnetic conductivity, i.e., for example, the ferrofluid, is eliminated.

In order not to have to deform the reversibly deformable container in more than one spatial direction in order to bridge the air gap between primary coil arrangement and secondary coil arrangement, it is advantageous to design the container so that the reversibly deformable container is telescopic in the direction of the respective other coil arrangement. An exact displacement direction toward the respective other coil arrangement is specified by this measure, whereby the amount of the deformation can be minimized.

A simple and thus advantageous design of the reversibly deformable container is achieved in that it is a telescopic bellows, preferably a folded bellows having a closed bellow end. Alternatively, the reversibly deformable container can also advantageously be designed as a telescopic tube arrangement having a closed tube end.

To implement the highest possible magnetic flux, it is furthermore advantageous if the reversibly deformable container comprises a soft magnetic wall corresponding to the other coil arrangement on its side facing toward the respective other coil arrangement.

To deform the reversibly deformable container, it is advantageous to convey the liquid of high magnetic conductivity by means of a power-driven conveyor mechanism under pressure from a storage container into the reversibly deformable container, in such a way that the reversibly deformable container deforms in dependence on the conveyed quantity of liquid of high magnetic conductivity. In this way, the amount of the deformation may be exactly determined in particular in a telescopic device. The power-driven conveyor mechanism can comprise a cylinder-piston arrangement here. However, other conveyor mechanisms such as screw conveyors are also conceivable. If the piston of a cylinder-piston arrangement is to be driven, the piston can thus be driven mechanically or pneumatically or hydraulically or electrically.

Since ferromagnetic liquids tend to heat up in alternating fields due to the continuous reorientation of the magnetic particles, it is advantageous if the liquid of high magnetic conductivity is in thermally-conductive contact with a cooling arrangement, at least during the inductive power transmission.

To enable the most optimum possible positioning of the reversibly deformable container filled with the liquid of high magnetic conductivity, it is advantageous to provide a measuring unit to determine the size of the air gap between primary coil arrangement and secondary coil arrangement and to control the power-driven conveyor mechanism for the liquid in dependence on the size of the air gap.

To minimize the effort, at least for the coil arrangement, in its region in which the reversibly deformable container filled with liquid of high magnetic conductivity is arranged, the magnetic core of this coil arrangement can advantageously be formed by means of the liquid of high magnetic conductivity. This design also makes it possible to form the contact surface of the liquid with a cooling arrangement having a large area.

In terms of the double use of existing devices, it is advantageous, if the reversibly deformable container filled with liquid of high magnetic conductivity is arranged on the vehicle, that force can be applied to the piston of the cylinder-piston arrangement using a medium which is provided in any case in the vehicle and can be conveyed and pressurized using a pump device. Such a medium can be, for example, the air of a variable air suspension, the oil of a brake system, pressure lubrication, or power steering.

The method for operating a charging device of the above-defined manner provides, as an alternative to energizing using an alternating current, energizing the primary coil arrangement using a pulsed direct current to charge the vehicle battery. The heat development of the arrangement is minimized by this measure.

BRIEF DESCRIPTION OF THE DRAWINGS

Further designs and advantages of the invention are explained in greater detail hereinafter on the basis of the drawings. In the figures.

DETAILED DESCRIPTION

Figure 1:
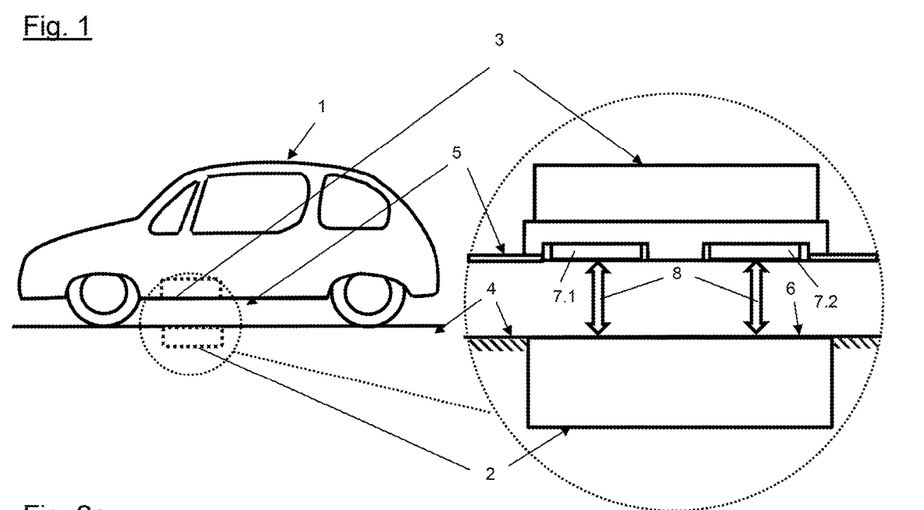
FIG. 1 shows a schematic illustration of an inductive charging arrangement having a secondary coil arrangement having folded bellows arranged on a passenger vehicle and a primary coil arrangement arranged outside the passenger vehicle

The illustration according to FIG. 1 shows a schematic illustration of an inductive charging arrangement having a secondary coil arrangement 3 arranged on a passenger vehicle 1 and a primary coil arrangement 2 arranged outside the passenger vehicle 1 in a surface 4 traversable by the passenger vehicle 1. The passenger vehicle 1, on the underbody 5 of which the secondary coil arrangement 3 is located, is shown on the left in the figure. If the passenger vehicle 1 is accordingly positioned on the traversable surface 4, the primary coil arrangement 2 incorporated into the traversable surface 4 is opposite to the secondary coil arrangement 3 located in the passenger vehicle 1. A detail illustration of primary coil arrangement 2 and secondary coil arrangement 3 is shown greatly simplified in section on the right in FIG. 1. It may be seen here that the primary coil arrangement 2 is incorporated into the traversable surface 4 such that its planar end surface 6 oriented upward aligns with the traversable surface 4. The secondary coil arrangement 3 is located in the interior of the body of the passenger vehicle 1 and is arranged therein such that two folded bellows 7.1, 7.2 protrude through the underbody 5 of the passenger vehicle 1. As explained in greater detail hereinafter, the folded bellows 7.1, 7.2 or the filling thereof form a magnetic circuit together with the primary coil arrangement 2 and the secondary coil arrangement 3 such that the air gaps indicated by the double arrows 8 are part of the magnetic circuit. As is generally known, the magnetic conductivity of air is poor in comparison to a ferromagnetic material, so that the air gaps have to be minimized to implement correspondingly high transmission powers from the primary coil 2 to the secondary coil arrangement 3. FIG. 2a to FIG. 2d show by way of example how this can be accomplished according to the invention. The reference numerals have been adopted as already introduced in conjunction with FIG. 1.

Figure 2A:
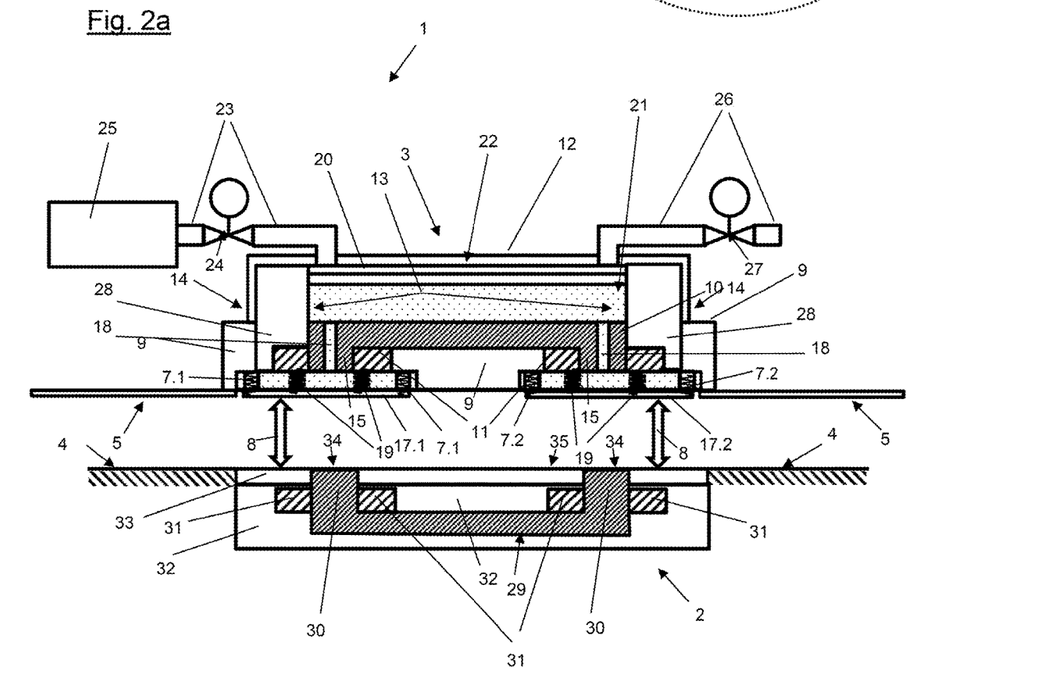
FIG. 2a shows a schematic illustration of an inductive charging arrangement having spring-loaded folded bellows, arranged on the vehicle in the region of the secondary coil arrangement, in the idle position, shown in section

In FIG. 2a, the inductive charging arrangement shown on the right in FIG. 1 is shown in the idle position in section. As stated above, the charging arrangement comprises a primary coil arrangement 2, incorporated into a surface 4 traversable by the passenger vehicle 1, and a vehicle-side secondary coil arrangement 3. The latter is arranged on the underbody 5 of the passenger vehicle 1, in its interior. It comprises a carrier arrangement 9, on which, on the one hand, the secondary coil, consisting of a secondary coil core 10 and a secondary coil winding 11 is arranged and, on the other hand, a pot-like storage container 12, the pot opening 13 of which directly adjoins the carrier arrangement 9. The pot edge 14 of the pot-like storage container 12 is connected to the carrier arrangement 9 in a fluid-tight manner. A movable wall 20 is arranged in the storage container 12 in such a way that it divides the storage container 12 into two parts in a fluid-tight manner in the horizontal direction, so that on one side there is a storage chamber 21 and on the other side a pressure chamber 22. The pressure chamber 22 is connected via a first line 23, in which a first controllable valve 24 is arranged, to a compressed air source 25 and via a second line 26, in which a second controllable valve 27 is arranged, to the ambient air.

Starting from the underbody 5, the carrier arrangement 9 extends into the interior of the passenger vehicle 1. The storage container 12 is fastened to the side of the carrier arrangement 9 facing away from the underbody 5. The secondary coil core 10 arranged on the carrier arrangement 9 borders, on the one hand, directly on the pot opening 13 of the pot-like storage container 12 and in this case on the storage chamber 21 thereof and comprises attachments 15, which support the secondary coil winding 11, on its side facing away therefrom. An aperture is provided on the underbody 5, through which two folded bellows 7.1, 7.2 protrude. The folded bellows 7.1, 7.2 are connected on one open side thereof to the carrier arrangement 9 in a fluid-tight manner and are closed on the other open side thereof by a fluid-tight plate 17.1, 17.2 in each case. The folded bellows 7.1, 7.2 are arranged on the carrier arrangement 9 such that the attachments 15 on the secondary coil cord 10 and the secondary coil winding 11 arranged thereon each face toward the interior of one of the folded bellows 7.1, 7.2. Furthermore, openings 18 are provided in the attachments 15 of the secondary coil core 10, which connect the storage chamber 21 of the storage container 12 to the interior of the folded bellows 7.1, 7.2. Cooling devices 28, which are used to cool the arrangement, are arranged in thermally-conductive contact with the secondary coil winding 11, the secondary coil core 10, and the ferrofluid, both in the folded bellows 7.1, 7.2 and also in the storage chamber 2. Between each of the fluid-tight plates 17.1, 17.2 and the carrier arrangement 9, there are tension springs 19 which pretension the fluid-tight plates 17.1, 17.2 and thus the folded bellows 7.1, 7.2 against the carrier arrangement 9. The storage chamber 21, the openings 18, and the interior of the folded bellows 7.1, 7.2 are completely filled using a ferrofluid such that there are no air spaces therein. In the idle position of the folded bellows 7.1, 7.2 described above, the sides of the fluid-tight plates 17.1, 17.2 facing away from the interior of the folded bellows 7.1, 7.2 terminate flush with the outer side of the underbody 5.

Figure 2B:
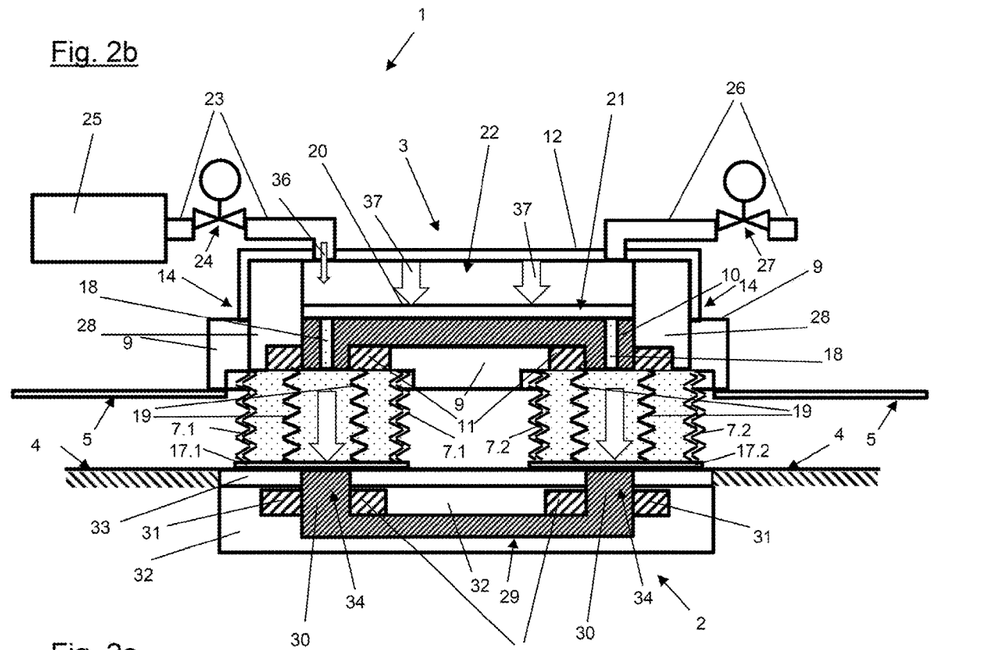
FIG. 2b shows the inductive charging arrangement according to FIG. 2a in the working position

The primary coil arrangement 2 comprises a carrier part 32, in which a primary coil core 29 is arranged. This is provided with formations 30 and carries the primary coil winding 31 arranged thereon. The carrier part 32 is closed off from the traversable surface 4 by a cover 33 which is penetrated by the formations 30 such that the end faces 34 of the formations 30 and the cover surface 35 form a plane that is part of the traversable surface 4. The dimensional design of the primary coil arrangement 2 and the secondary coil arrangement 3 is such that the end faces 34 of the formations 30 on the primary coil arrangement 2 and the fluid-tight plates 17.1, 17.2 on the secondary coil arrangement 3 can be made congruent by corresponding positioning of the passenger vehicle 1 above the primary coil arrangement 2 when the fluid tight plates 17.1, 17.2 are lowered into the working position (FIG. 2b). As can be seen from the illustration, the fluid-tight plates 17.1, 17.2 and the respective folded bellows 7.1, 7.2 located behind them and filled using the ferrofluid are significantly larger than the end faces 34, so that a corresponding horizontal tolerance is permissible when positioning the secondary coil arrangement 3 in relation to the primary coil arrangement 2.

In the above-described state, the primary coil arrangement 2 and the secondary coil arrangement 3 form the air gaps indicated by the double arrows 8.

As stated above, in order to optimize the energy transmission from the primary coil arrangement 2 to the secondary coil arrangement 3, the air gap between them is to be minimized. FIG. 2b shows how this happens. Since FIG. 2b differs from above-described FIG. 2a only with respect to the location of some components, but the components themselves are the same, the reference signs from FIG. 2a have been adopted. Furthermore, to avoid repetition, reference is made to the description of FIG. 2a with respect to the description of these components. In order to minimize the air gaps indicated by the double arrows 8 in FIG. 2a, pressure is built up in the compressed air source 25 and the first controllable valve 24 is opened, so that compressed air, as indicated by the compressed air arrow 36, flows into the pressure chamber 22, whereby the movable wall 20 is displaced in the direction of the first displacement arrows 37 toward the secondary coil core 10. The ferrofluid located in the storage chamber 21 is displaced through the openings 18 in the folded bellows 7.1, 7.2 by this displacement, so that they are unfolded by the essentially incompressible ferrofluid, whereby the fluid-tight plates 17.1, 17.2 move in the direction of the second displacement arrows 38 toward the primary coil arrangement 2 and further tension the tension springs 19. The supply of compressed air into the pressure chamber 22 continues until it is determined by a measuring unit (not shown) that the air gap is minimized, the first controllable valve 24 is then closed by a control unit (not shown). In this state, also referred to as the working position of the arrangement, the fluid-tight plates 17.1, 17.2 each abut the end faces 34 of the formations 30 and the air gap is minimized. The primary coil winding 31 is now energized.

Figure 2C:
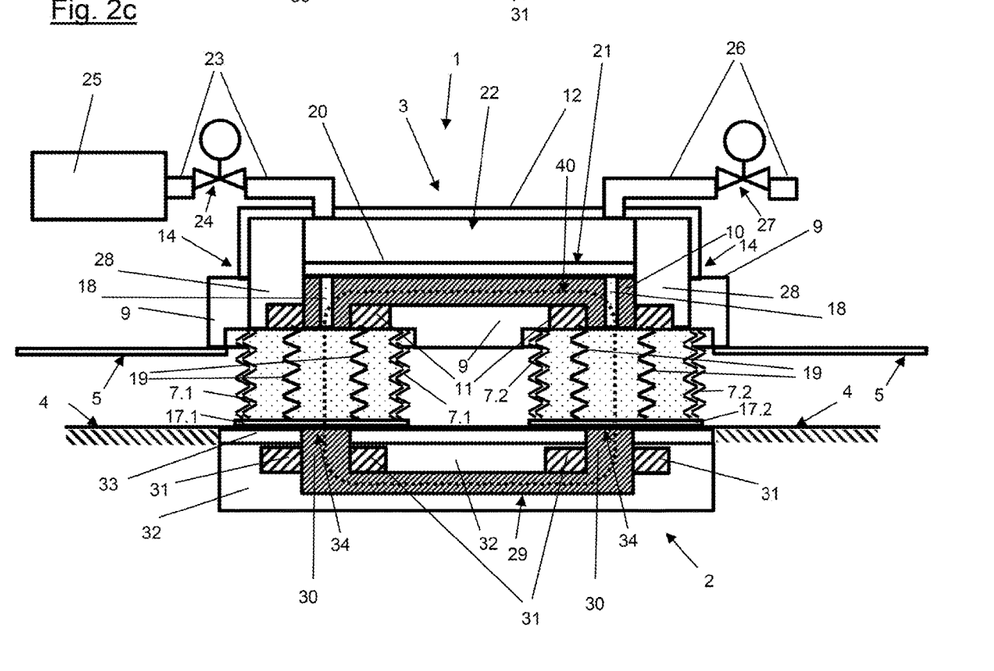
FIG. 2c shows the inductive charging arrangement according to FIG. 2b having energized primary coil

According to the illustration in FIG. 2c, which is identical except for slight deviations to FIG. 2b, a magnetic field forms due to the energizing, which extends essentially through the primary coil core 29, the ferrofluid located in the folded bellows 17.1, 17.2, and the secondary coil core 10. Said magnetic field is indicated by the dashed line 40. Since FIG. 2b and FIG. 2c do not differ in all points important here, the reference signs used therein were adopted. With regard to the description of the components, reference is made to the above in order to avoid repetitions.

Due to the energizing of the primary coil windings 31 and the magnetic field thus created, a voltage is induced in the secondary coil winding and a battery (not shown) is charged by means of this voltage via charging electronics (not shown). Because the air gap is minimized by means of the ferrofluid, correspondingly higher transmission powers may be achieved.

Figure 2D:
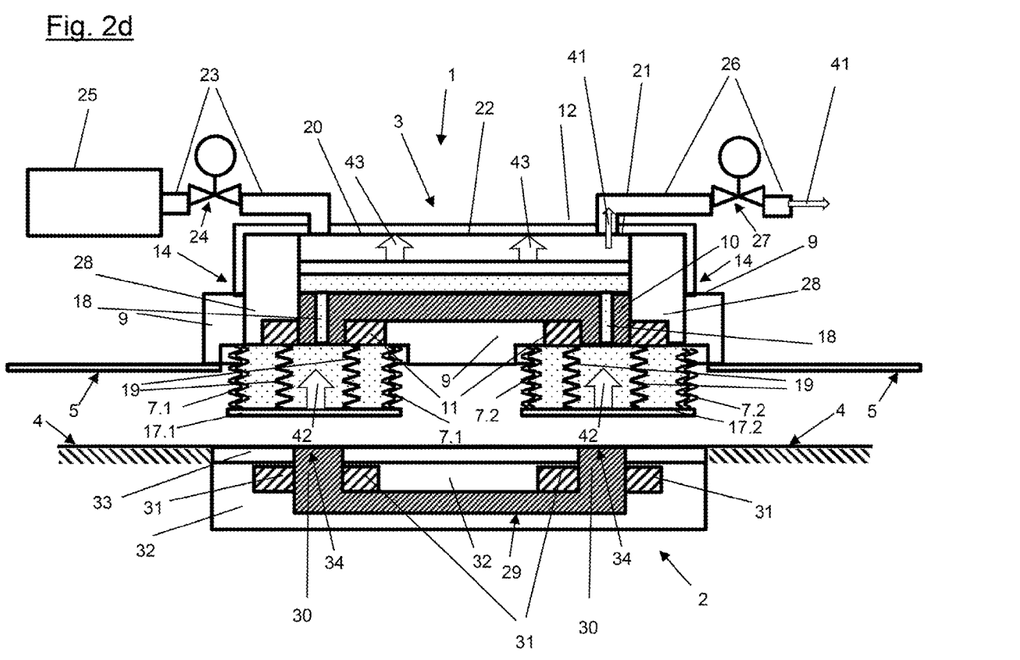
FIG. 2d shows the inductive charging arrangement according to FIG. 2b when returning into the idle position

After the charging procedure has ended, the energizing of the primary coil winding 31 is stopped and according to the illustration in FIG. 2d, the second controllable valve 27 is opened, so that the pressure in the pressure chamber 22 can thus dissipate, as indicated by the outflow arrows 41. Since FIG. 2d does not differ significantly from FIG. 2c, the reference signs used therein were adopted. With regard to the description of the components, reference is made to the above in order to avoid repetitions.

Due to the now depressurized pressure chamber 22, on the one hand, and the tensioned tension springs 19, on the other hand, the ferrofluid located in the folded bellows 7.1, 7.2 is pressed back into the storage space 21 via the openings 18. As a result, on the one hand, the fluid-tight plates 17.1, 17.2 are displaced back in the direction of the first return displacement arrows 42 and, on the other hand, the movable wall 20 is displaced back in the direction of the second return displacement arrows 43 into its starting position according to FIG. 2a.

Notwithstanding the above-described example, in which the return displacement of the folded bellows 7.1, 7.2 into their idle position is based solely on the spring force of the tension springs 19, it can also be provided that the return displacement is performed or assisted by generating a partial vacuum in the pressure chamber 22.

The above-described embodiment, which uses compressed air to displace the movable wall 20, can also be designed differently such that another medium, for example, oil, is provided as the medium for displacing the movable wall 20. In such a case, the medium is pumped out of the pressure chamber 22 after the charging procedure has ended and supplied to a storage container for the medium (not shown), from which the pressure source is also supplied, so that a circuit (not shown) is provided. Furthermore, a lock (not shown) can be provided to secure the folded bellows 7.1, 7.2 in their idle position. Of course, this lock is to be disengaged before each lowering of the folded bellows 7.1, 7.2.

Figure 3:
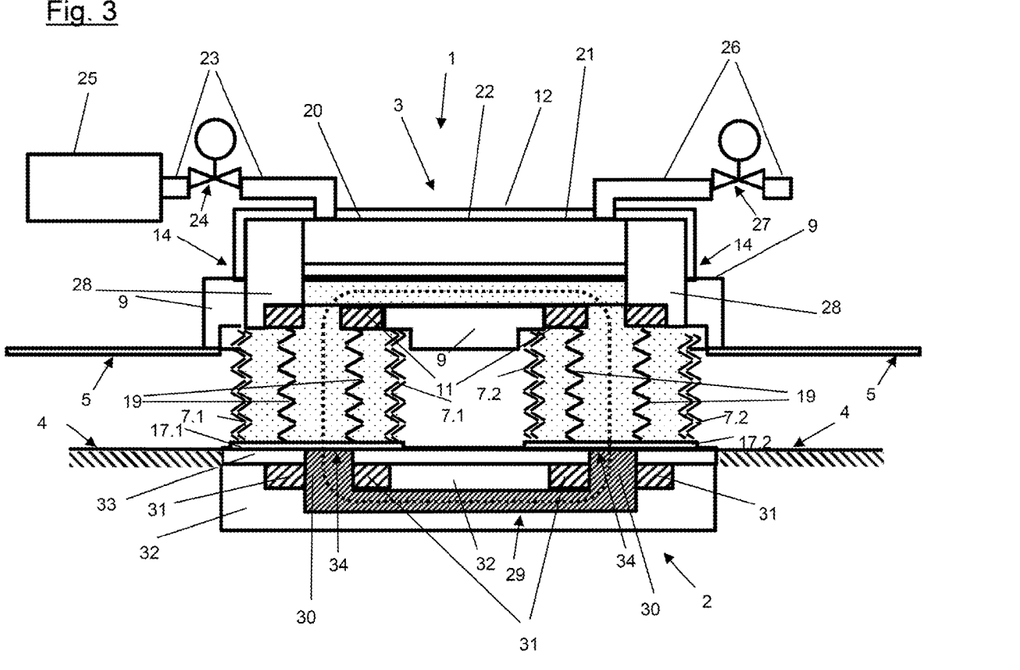
FIG. 3 shows the inductive charging arrangement according to FIG. 2c having energized primary coil and secondary coil core replaced by the ferrofluid

FIG. 3 shows a further design which differs slightly from the design of the inductive charging arrangement according to FIG. 2a to FIG. 2d. Since the difference is minor and the illustration also only differs slightly from the illustration in FIG. 2c, the reference signs were adopted from FIG. 2c where applicable. The difference is that in the arrangement according to FIG. 3, the secondary coil core is replaced by the ferrofluid. This liquid now also assumes the function of the secondary coil core. Accordingly, the secondary coil windings are suitably fastened directly on the carrier arrangement 9. The arrangement according to FIG. 3 thus represents, on the one hand, an optimization in terms of saving components, on the other hand, the contact area for the thermal contact between cooling device 28 and ferrofluid may thus be enlarged and its cooling may thus be improved.

As already mentioned at the outset, at least one reversibly deformable container, filled or fillable with a liquid of high magnetic conductivity, can be arranged and formed in the region of the primary coil arrangement and/or in the region of the secondary coil arrangement such that the container deforms in the direction of the respective other coil arrangement of the counter coil arrangement by pressurizing the liquid of high magnetic conductivity. An example of the first of these three conceivable variants of arranging reversibly deformable containers filled or fillable using a liquid of high magnetic conductivity is shown in FIG. 1, and this first arrangement is described in greater detail with the aid of the illustrations according to FIG. 1, FIGS. 2a to 2d, and FIG. 3. An example of a second variant of arranging the reversibly deformable containers filled or fillable with a liquid of high magnetic conductivity is also shown in a schematic illustration in FIG. 4a. According to this embodiment, the inductive charging arrangement is also designed such that it comprises a secondary coil arrangement 3' arranged on a passenger vehicle 1' and outside the passenger vehicle 1' comprises a primary coil arrangement 2' arranged in a surface 4 traversable by the passenger vehicle 1. The passenger vehicle 1', on the underbody 5' of which the secondary coil arrangement 3' is located, is shown on the left in the illustration. If the passenger vehicle 1' is accordingly positioned on the traversable surface 4', the primary coil arrangement 2' incorporated into the traversable surface 4' is opposite to the secondary coil arrangement 3' located in the passenger vehicle 1'. A detail illustration of primary coil arrangement 2' and secondary coil arrangement 3' is shown on the right in FIG. 4a. It may be seen here that the primary coil arrangement 2' is incorporated into the traversable surface 4' such that its planar end surface 6' oriented upward aligns with the traversable surface 4. Two folded bellows 7.1', 7.2' protrude through the end face 6'. The folded bellows 7.1', 7.2' or the filling thereof, which also consists of a ferrofluid here, form a magnetic circuit together with the primary coil arrangement 2 and the secondary coil arrangement 3 such that the air gaps indicated by the double arrows 8' are part of the magnetic circuit. As already stated repeatedly, the air gaps are to be minimized in order to achieve correspondingly high transmission powers from the primary coil arrangement 2' to the secondary coil arrangement 3'. For this purpose, the amount of ferrofluid in the folded bellows 7.1', 7.2' is increased. This takes place similarly as described above. In this way, the folded bellows 7.1', 7.2', which are under spring action, are deformed against the spring action in the direction of the secondary coil arrangement 3' in such a way that the air gaps identified by the double arrows 8' are bridged by the filling using the ferrofluid. The position of the folded bellows 7.1', 7.2' is shown in this working position with a dash-dotted line. Since the ferrofluid is also in direct contact with the coil core (not shown) of the primary coil arrangement 2' in this embodiment, the magnetic resistance of the arrangement is minimized and thus a correspondingly high transmission power is implemented from the primary coil arrangement 2' to the secondary coil arrangement 3'. If the amount of ferrofluid in the folded bellows 7.1', 7.2' is reduced again after the charging procedure, they return back into their starting position due to the spring action.

Figure 4A:
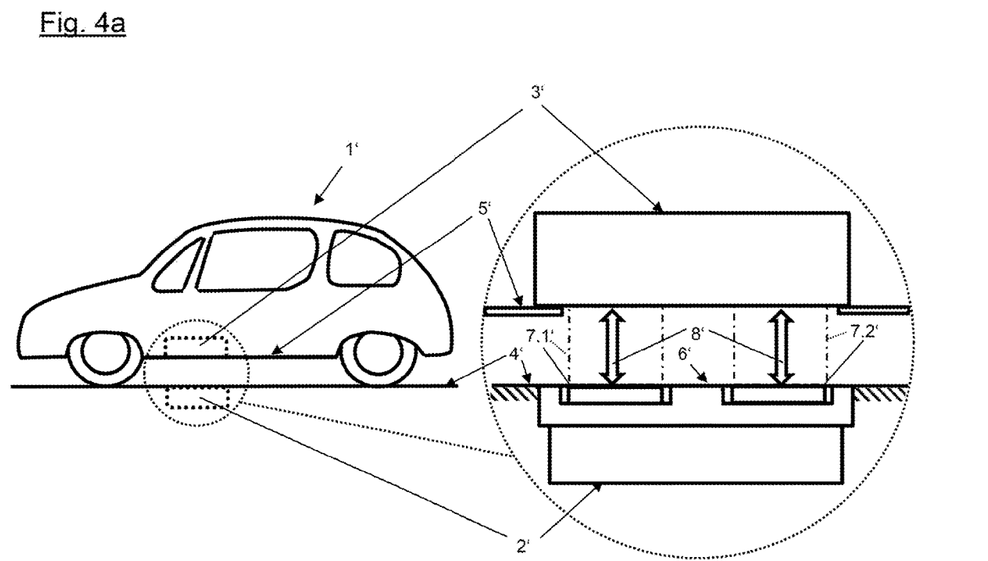
FIG. 4a shows a schematic illustration of an inductive charging arrangement having a secondary coil arrangement arranged on a passenger vehicle and a primary coil arrangement having folded bellows arranged outside the passenger vehicle
Figure 4B:
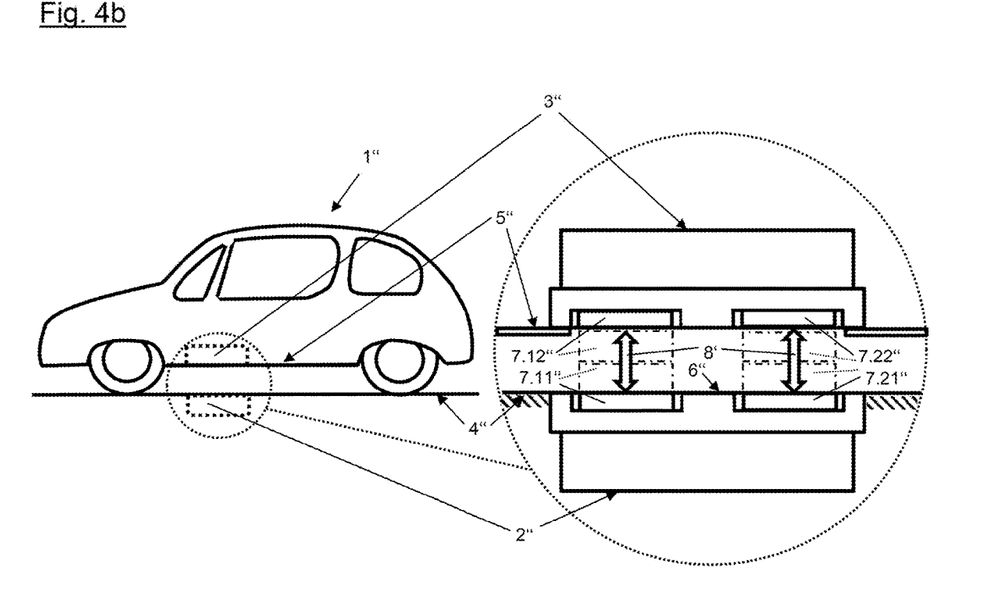
FIG. 4b shows a schematic illustration of an inductive charging arrangement having a secondary coil arrangement having folded bellows arranged on a passenger vehicle and a primary coil arrangement having folded bellows arranged outside the passenger vehicle

An example of a third variant of arranging the reversibly deformable containers filled or fillable using a liquid of high magnetic conductivity is also shown in a schematic illustration in FIG. 4b. The inductive charging arrangement also consists in this embodiment of a secondary coil arrangement 3" arranged on a passenger vehicle 1" and a primary coil arrangement 2" arranged outside the passenger vehicle 1" in a surface 4" traversable by the passenger vehicle 1". The passenger vehicle 1", on the underbody 5" of which the secondary coil arrangement 3" is located, is shown on the left in the figure. If the passenger vehicle 1" is accordingly positioned on the traversable surface 4" as shown, the primary coil arrangement 2" incorporated into the traversable surface 4" is opposite to the secondary coil arrangement 3" located in the passenger vehicle 1". A detail illustration of primary coil arrangement 2" and secondary coil arrangement 3" is shown on the right in FIG. 4b. The primary coil arrangement 2" is also incorporated into the traversable surface 4 in this embodiment such that its planar end surface 6" oriented upward aligns with the traversable surface 4". The secondary coil arrangement 3" is located in the interior of the body of the passenger vehicle 1" and is arranged therein such that two folded bellows 7.1", 7.22" protrude through the underbody 5" of the passenger vehicle 1'. The primary coil arrangement 2" incorporated into the traversable surface 4" also comprises a planar, upwardly oriented end face 6' here, which aligns with the traversable surface 4. Two folded bellows 7.11", 7.21" protrude through the end face 6'. The folded bellows 7.11", 7.21' or the filling thereof, which again consists of a ferrofluid, form a magnetic circuit together with the primary coil arrangement 2" and the secondary coil arrangement 3" and the folded bellows 7.12", 7.22" arranged thereon such that the air gaps indicated by the double arrows 8" are part of the magnetic circuit. As already stated repeatedly, the air gaps are to be minimized in order to achieve correspondingly high transmission powers from the primary coil arrangement 2" to the secondary coil arrangement 3". For this purpose, the amount of ferrofluid is increased, on the one hand, in the folded bellows 7.11", 7.21", which are under spring action and are arranged on the primary coil arrangement 2'. This takes place similarly as described above. Simultaneously, the amount of ferrofluid is increased, on the other hand, in the folded bellows 7.12", 7.22", which are under spring action and are arranged on the secondary coil arrangement 3'. This also takes place similarly as described above. In this way, the folded bellows 7.11", 7.21" on the primary coil arrangement 2", which are under spring action, and the bellows 7.12", 7.22" on the secondary coil arrangement 3" are each deformed toward one another against the spring action until they mutually touch. As a result, the air gaps identified by the double arrows 8" are bridged by the filling using the ferrofluid. The position of the folded bellows 7.11", 7.21", 7.12", 7.22" is shown in each case this working position with a dash-dotted line.

Since the ferrofluid is also in direct contact in each case with the coil core (not shown) of the primary coil arrangement 2" or with the coil core (not shown) of the secondary coil arrangement 3" in this embodiment, the magnetic resistance of the arrangement is minimized and thus a correspondingly high transmission power is implemented from the primary coil arrangement 2" to the secondary coil arrangement 3". If the amount of ferrofluid in the folded bellows 7.11", 7.21" or the folded bellows 7.12", 7.22" is reduced again after the charging procedure, they return back into their starting position due to the spring action.

The embodiment variants described above in conjunction with FIGS. 4a and 4b have the advantage that because the folded bellows 7.1', 7.2' on the primary coil arrangement 2' (FIG. 4a) or the folded bellows 7.11", 7.21" on the primary coil arrangement 2" (FIG. 4b), respectively, have to rise significantly above the level of the traversable surface 4" (FIG. 4a) or the traversable surface 4" (FIG. 4b), objects possibly located on the traversable surface 4', 4" slide off and are thus removed from the transmission region. This effect can be reinforced in that the end faces of the folded bellows 7.1', 7.2' (FIG. 4a) or 7.11", 7.21" (FIG. 4b) are crowned or pyramid-shaped in a variant that is not shown, which makes it possible for even small objects to slide off. In the case of such an optimized variant, the counterparts on the secondary coil arrangement are of course to be provided with a corresponding, negative shape for reasons of air gap minimization. Such a design furthermore has the advantage that centering may thus be achieved, because folded bellows permit a slight lateral movement and thus centering.

As already mentioned at the outset, the arrangement according to the invention is not limited to the use of folded bellows as reversibly deformable containers; instead, any containers designed to permit reversible longitudinal deformation may be used to hold the liquid of high magnetic conductivity, i.e., for example, a ferrofluid. Arrangements are particularly to be emphasized here in which tube pieces of different diameters are arranged fluid-tight one inside another to be longitudinally displaceable and, closed on one side, may be telescoped by increasing the enclosed fluid amount. Such arrangements can be exchanged directly for folded bellows.

The above-described arrangements use a coil arrangement which is referred to as a DD coil arrangement and is described at the outset. Of course, the principle using the reversibly deformable containers fillable using a liquid of high magnetic conductivity may be applied to all known coil arrangements, in particular also to circular coil arrangements and coaxial coil arrangements as described at the outset.

In order to minimize the heat development of the arrangement, which, as mentioned above, is caused by the continuous reorientation of the magnetic particles in the ferrofluid when a magnetic field induced by an alternating current acts thereon, the primary coil arrangement 2, 2', 2" can advantageously be energized using a pulsed direct current. In this case, there is no reorientation of the magnetic particles, so that the heat development is also restricted to a minimum.

The invention claimed is:

1. An Inductive charging arrangement for a vehicle battery comprising:
   a counter coil arrangement which further comprises at least one primary coil arrangement located outside the vehicle and at least one secondary coil arrangement located inside the vehicle, wherein primary coil arrangement and secondary coil arrangement each comprise a coil and a magnetic core and, with appropriate positioning of the vehicle and energizing of the primary coil arrangement, electric energy is transmitted by inductive coupling from the primary coil arrangement to the secondary coil arrangement, wherein the air gap is part of the transmission region and means are provided to minimize the air gap between the primary coil arrangement and the secondary coil arrangement, wherein at least one reversibly deformable container filled or fillable using a liquid of high magnetic conductivity is arranged and formed in the region of the primary coil arrangement and/or the region of the secondary coil arrangement such that the container deforms in the direction of the respective other coil arrangement of the counter coil arrangement due to pressurizing of the liquid of high magnetic conductivity, and in that the deformable container and the liquid of high magnetic conductivity located therein are arranged such that the liquid of high magnetic conductivity, at least after the deformation of the reversibly deformable container, minimizing the air gap, is part of the transmission region between primary coil arrangement and secondary coil arrangement,
   wherein the at least one reversibly deformable container comprises a soft magnetic wall corresponding to the other coil arrangement on its side facing toward the respective other coil arrangement, and
   wherein the primary coil core of the primary coil arrangement and/or the secondary coil core of the secondary coil arrangement is formed by the liquid of high magnetic conductivity.

2. The charging device as claimed in claim 1, wherein the liquid of high magnetic conductivity is a ferrofluid.

3. The charging device as claimed in claim 1, wherein the at least one reversibly deformable container is spring-loaded against its deformation direction.

4. The charging device as claimed in claim 1, wherein the at least one reversibly deformable container is telescopic in the direction of the respective other coil arrangement of the counter coil arrangement.

5. The charging device as claimed in claim 4, wherein the at least one reversibly deformable container is a telescopic bellows, preferably a folded bellows having a closed end.

6. The charging device as claimed in claim 4, wherein the at least one reversibly deformable container is a telescopic tube arrangement having a closed tube end.

7. The charging device as claimed in claim 1, wherein the liquid of high magnetic conductivity can be conveyed by means of a power-driven conveyor mechanism under pressure from a storage chamber into the at least one reversibly deformable container, in such a way that the reversibly deformable container deforms in dependence on the conveyed quantity of liquid of high magnetic conductivity.

8. The charging device as claimed in claim 7, wherein the power-driven conveyor mechanism comprises a cylinder-piston arrangement.

9. The charging device as claimed in claim 7, wherein the piston of the cylinder-piston arrangement is driven mechanically or pneumatically or hydraulically or electrically.

10. The charging device as claimed in claim 1, wherein the liquid of high magnetic conductivity is in thermally-conductive contact with a cooling device at least during the inductive power transmission.

11. The charging device as claimed in claim 7, wherein a measuring device for determining the size of the air gap between primary coil arrangement and secondary coil arrangement is provided, and in that the power-driven conveying mechanism can be controlled in dependence on the size of the air gap.

12. The charging device as claimed in claim 7, wherein force can be applied to the piston of the piston-cylinder arrangement using a medium, which is provided in any case in the vehicle and can be conveyed and pressurized using a pump device.

13. A method for operating a charging device comprising:
    a counter coil arrangement which further comprises at least one primary coil arrangement located outside the vehicle and at least one secondary coil arrangement located inside the vehicle, wherein primary coil arrangement and secondary coil arrangement each comprise a coil and a magnetic core and, with appropriate positioning of the vehicle and energizing of the primary coil arrangement, electric energy is transmitted by inductive coupling from the primary coil arrangement to the secondary coil arrangement, wherein the air gap is part of the transmission region and means are provided to minimize the air gap between the primary coil arrangement and the secondary coil arrangement, wherein at least one reversibly deformable container filled or fillable using a liquid of high magnetic conductivity is arranged and formed in the region of the primary coil arrangement and/or the region of the secondary coil arrangement such that the container deforms in the direction of the respective other coil arrangement of the counter coil arrangement due to pressurizing of the liquid of high magnetic conductivity, and in that the deformable container and the liquid of high magnetic conductivity located therein are arranged such that the liquid of high magnetic conductivity, at least after the deformation of the reversibly deformable container, minimizing the air gap, is part of the transmission region between primary coil arrangement and secondary coil arrangement,
    wherein the primary coil is energized using a pulsed direct current,
    wherein the at least one reversibly deformable container comprises a soft magnetic wall corresponding to the other coil arrangement on its side facing toward the respective other coil arrangement, and
    wherein the primary coil core of the primary coil arrangement and/or the secondary coil core of the secondary coil arrangement is formed by the liquid of high magnetic conductivity.

14. The charging device as claimed in claim 2, wherein the at least one reversibly deformable container comprises a soft magnetic wall corresponding to the other coil arrangement on its side facing toward the respective other coil arrangement.

15. The charging device as claimed in claim 3, wherein the at least one reversibly deformable container comprises a soft magnetic wall corresponding to the other coil arrangement on its side facing toward the respective other coil arrangement.

* * * * *